July 24, 1934.  W. T. LIVERMORE ET AL  1,967,833

SHOCK ABSORBER

Filed Jan. 21, 1932

INVENTOR
WILLIAM T. LIVERMORE
ALBERT E. FREEMAN
BY John J. Lynch
ATTORNEY

Patented July 24, 1934

1,967,833

UNITED STATES PATENT OFFICE 1,967,833

SHOCK ABSORBER

William T. Livermore, Westfield, and Albert E. Freeman, East Orange, N. J.

Application January 21, 1932, Serial No. 587,864

12 Claims. (Cl. 188—88)

This invention relates to hydraulic shock absorbers and in particular to an automatic means for varying the resistance of a hydraulic shock absorber to the relative motion of the axle and the body of a vehicle in accordance with the character of the road surface and the load carried by the vehicle. If the road is rough and has frequent large bumps and tends to produce large movements of the vehicle axle, the resistance will be increased whereas if the road is smooth and only small irregularities are encountered, the resistance offered by the shock absorber will be decreased.

An equally important object of our invention is to eliminate the so-called "boulevard jiggle" on smooth roads which would be experienced with a stiff shock absorber and at the same time give adequate resistance to heavy bumps on rough roads. This feature of the invention operates automatically and thus does away with the necessity of any attention on the part of the driver of the vehicle for regulating the operation of the shock absorber to adjust it to various road conditions.

A still further and equally important object of our invention is to provide in a device of the character referred to, a means for delaying the return of the adjusting means to normal position as well as the automatic adjustment of the operating part to the type of road. Our invention also contemplates the automatic adjustment of the degree of control obtained not only with respect to the road condition but also with respect to the load condition of the vehicle so that the adjustment means is automatically operated depending upon the load of the vehicle as well as being automatically operated, depending upon the road conditions which latter adjustment is caused by the condition of the road over which the vehicle is travelling.

Figure 1:
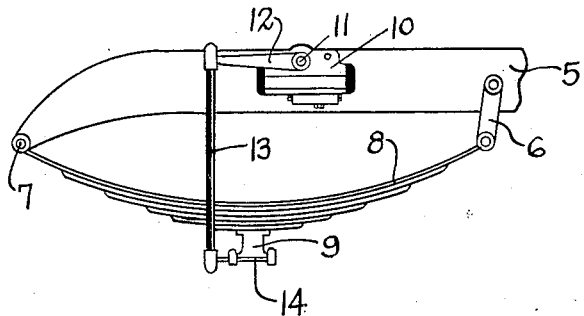

Changes and variations may be made in the construction shown and described without departing from the principles of the invention or sacrificing its chief advantages; hence such invention is not to be confined to the structures shown in the accompanying drawing; in which, Figure 1 is a view in elevation of a part of a vehicle showing the mounting of the chassis on an axle through the medium of a yieldable spring, the axle being connected to the shock absorber for actuation when the spring yields.

Figure 2:
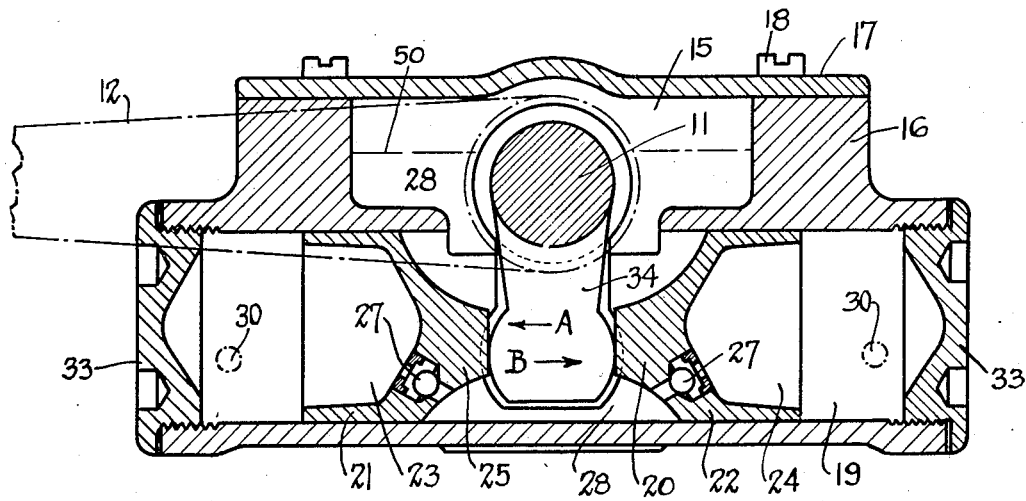
Figure 3:
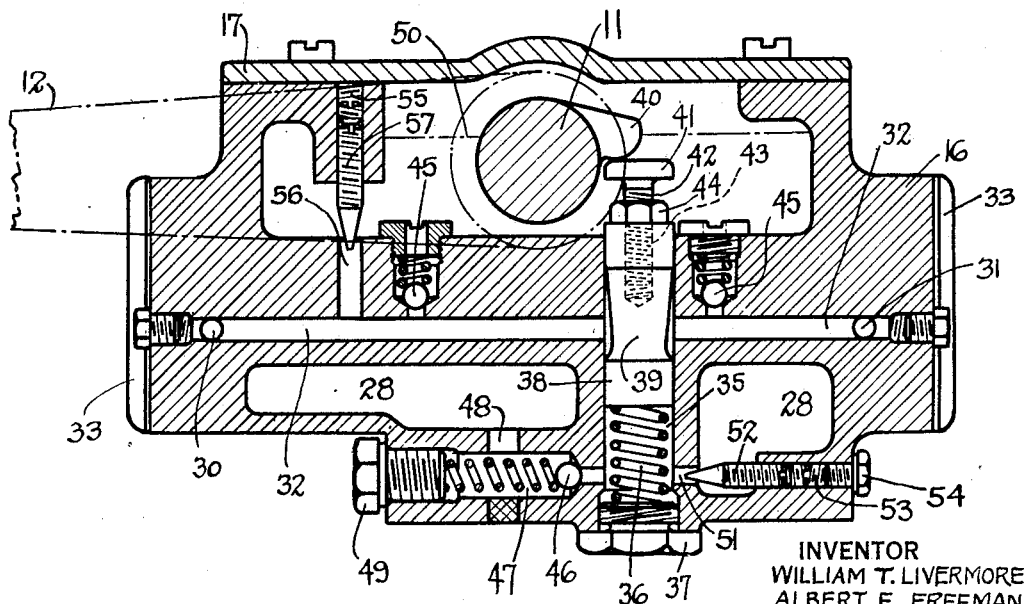

Figure 2 is a longitudinal section taken through the shock absorber illustrated in Figure 1, the same being taken through the shock absorber to illustrate the action of the piston in the shock cushioning cylinder, and Figure 3 is a longitudinal section taken adjacent the section illustrated in Figure 1 illustrating the operating mechanism that is used to provide automatic means for varying the resistance of the shock absorber to the relative motion of the axle with respect to the body of the vehicle, in accordance with the character of the road surface or load of the vehicle.

Referring to the drawing in detail, 5 indicates a fragment of a vehicle chassis to which is connected through the medium of the usual links 6 and pin 7, the yieldable spring 8 which rests on the axle 9 and yields to road bumps encountered by the wheels of the vehicle as transmitted through the axle 9.

In order that the motion of the spring may be arrested with respect to the vehicle part or chassis or may be kept under control, use is made of the shock absorber 10 which, through the medium of a shaft 11 is operated internally as will be hereinafter described to keep the spring under control, the movements of the spring being imparted to the shaft 11 through the medium of the shaft arm 12 and the connecting link 13 which connect the end of the arm 12 to the axle 9 as by a bracket 14 secured to said axle.

Our invention may be used in connection with any type of shock absorber but for the purposes of illustration, we have shown one standard type embodying a shaft or operating part 11 which is journalled in the opposite wall 15 of the housing 16, said housing being in the nature of a casting, the top of which is closed by the cover 17 secured in place by the screws 18. The housing is bored to provide the cylinder 19 in which is positioned for reciprocating motion, the double ended piston 20, the ends 21 and 22 of which are provided with the chambers 23 and 24 respectively. This piston 20 is reduced in diameter at its center as at 25 to permit flow of oil thereabout and through the check valve 27 provided in each piston end to permit passage of oil or other liquid therethrough when the piston is in operation. Inasmuch as the operation of these check valves is understood, it is not believed that a detailed description is necessary, it being sufficient to note that they operate to admit oil from the chamber 28 to the piston spaces in front of the piston.

In these portions of the cylinders, there is provided passage openings 30 and 31 which open into the longitudinal passage 32 extending through the housing 16 in that portion in which is incorporated the control mechanism. The ends of the cylinder 19 are closed through the medium of suitable caps 33. The piston is reciprocated by the depending arm 34 which is attached to or made as an integral part of the shaft 11.

For the purposes of illustration an upward movement of the link 13 will operate the member 34 in the direction indicated by the arrow A, (Figure 2), while a movement downward of the link 13 will cause a movement of the piston operating member 34 in the direction indicated by the arrow B (Figure 2).

The passage 32 is intercepted by the plunger bore 35 in which is positioned, a coil spring 36 acting at one end against the plunger bore closing plug 37 and at its opposite end against the end of the plunger 38. This plunger intermediate its ends, which are shaped cylindrically to fit closely within the bore, is provided with a tapered section 39 so that from top to bottom, this tapered section 39 decreases in diameter and when the plunger operates across the passage 32, increases or decreases the resistance to the flow of the liquid or fluid through the passage depending upon the position of the plunger.

The shaft 11 is provided with a finger 40 which engages the flattened head 41 of a threaded stud 42 which has threaded connection with the threaded bore 43 of the plunger 38, this stud being secured in position through the medium of the lock nut 44 so that the end 41 of the stud can be adjusted relatively to the finger 40 on the shaft 11. This finger 40 may be secured directly to or made integral with the shaft 11 as desired. The pressure of the fluid in the passage 32 is relieved by the release valve 45, one being provided for each side of the passage 32 beyond the plunger bore 35.

The plunger bore 35 has operating in connection therewith, the release valve 46, the chamber 47 of which is connected through the bore 48 with the oil or liquid chamber or sump 28 in which the oil is stored, the level thereof being indicated by the numeral 50. The check valve bore 47 is closed through the medium of the plug 49.

The plunger bore 35 is also provided with a port 51 in connection with which operates the needle valve 52 which is adjustable in the threaded bore 53 of the housing 16, this bore being closed through the medium of a suitable plug 54 to prevent any leakage of oil from the housing. The end of this needle valve projects into the port 51 and restricts the flow of liquid therethrough to delay a movement of the plunger 38 as will be hereinafter described. A port 56 is also provided connecting the passage 32 with the reservoir 28 and into this passage there also extends a needle valve 57 which has threaded engagement in a bore 55 formed in the housing 16, this bore being covered by the cover plate 17. The cylindrical ends of the piston 38 practically form a leakproof connection with the wall of the plunger bore 35 so that the only passage of oil through the passage 32 that is possible, is about the tapered portion 39 of said plunger 38, and this passage of oil or liquid through the passage 32 is restricted in accordance with the position of the plunger.

In order to automatically vary the resistance of the shock absorber to relative motion of the axle and body of the vehicle in accordance with the character of the road surface, the plunger 39 when the car is at rest and unloaded, bears against the finger 40 and is substantially in the position illustrated in Figure 2. Downward motion of the finger 40 pushes the plunger 38 down expelling oil from that part of the plunger bore 35 beneath the plunger and through the check valve 46 into the reservoir 28. The spring 36 operating against the under surface of the plunger 38 tends to raise the same but its return raising movement is restricted by the flow of oil from the reservoir 28 through the port 51 which, as previously indicated, is provided with a needle valve and may be adjusted to suit operating conditions. This needle valve restricts the flow of oil through the port 51 from the oil reservoir of the shock absorber.

As it thus takes the plunger a predetermined time to rise, if the car is passing over a rough road and the plunger is frequently pushed down by operation of the finger 40 on the stud 42 which in turn is caused by the flexing of the spring 8 toward the body of the car and a consequent upward movement of the arm 12, the average position of the plunger will be low and that section of the tapered portion 39 of the plunger which is of larger diameter will be positioned in alignment with the passage 32 with the result that it will restrict the flow of oil through the passage 32 thereby stiffening the action of the shock absorber to increase the steadying effect of the car, this being due to the fact that the restriction in the passage 32 will prevent the free reciprocation of the shock absorber piston with the result that the resilient action of the spring 8 is retarded and does not have free play compared to the play that it would have if the passage 32 was not blocked and the piston in the shock absorber could reciprocate in a normal manner.

If the car is on a smooth road, the plunger 38 will not be pushed down as far and that section of the tapered portion which is of smaller diameter will not restrict the flow of oil through the passage 32 as much as when the plunger is in its lower position with the result that the shock absorber will not offer as much resistance to the motion of the car, or in other words, the action of the shock absorber piston will be freer due to the freer passage of the oil in the passage 32 about the plunger part 39 and thus the spring will be permitted freer play.

However, when the car passes from a rough road to a smooth road, the plunger 38 slowly rises adjusting itself to the new type of road surface, this rising being permitted because the smoother road will not actuate the link 13 and arm 12 as much as the rougher road would, with the result that the operation of the finger 40 will be through an arc of lesser length. When the car passes from the smooth road to the rough road, the reverse action takes place and the plunger is maintained in its depressed position retarding the flow of oil through the passage 32.

Our invention is an improvement over the manual types in commercial use in that it automatically adjusts itself to the degree of roughness of the road surface and eliminates the possibility of incorrect adjustment due to the driver of the vehicle forgetting to adjust it, or adjusting it incorrectly.

Our invention also eliminates the linkage required on the present type to connect the four shock absorbers that are employed in connection at the corners of the chassis to a lever convenient to the driver, with the attendant expense, complication and trouble to keep the parts in quiet operating condition.

It is evident also that our invention contemplates automatic adjustment of itself for variations in load in the car in that when the car becomes loaded, the plunger 38 is accordingly depressed by the finger 40 due to the load on the spring or rather, the decrease of distance between the axle 9 and the chassis 5 with the result that the operation of the piston is restricted more when the car is under load than when it is not loaded, and the greater the load, the greater will be the restriction to the movement of the piston.

The passage 56 connects the passage 32 with the sump 28, the passage 32 being connected as by 30 to the cylinder 19 and the valve 57 is set to provide the proper relation between the degree of control for the compression stroke of the car spring as compared with the rebound stroke by providing a by-pass for oil from the cylinder to the sump. The valves 45 are pressure safety valves.

Our invention is not to be restricted to the precise details of construction shown since various changes and modifications may be made therein without departing from the scope of the invention or sacrificing the advantages derived from its use.

What we claim is:—

1. The combination with a vehicle shock absorber having operating means for controlling the action of a vehicle spring caused by surface variations in a road, of means for automatically varying the action of said operating means to adjust the degree of control thereof to suit the road surface conditions, and said action varying means being initially set automatically by movement of the vehicle spring in one direction only to suit the various load conditions of the vehicle.

2. The combination with a vehicle shock absorber having operating means for controlling the action of a vehicle spring caused by surface variations in a road, of means movable into position by movement of the vehicle spring in one direction to alter the action of said operating means, and means for retarding the travel of said movable means, independently of a movement of the vehicle spring in another direction.

3. The combination with a vehicle shock absorber having operating means for controlling the action of a vehicle spring caused by surface variations in a road, including a chamber, an element movable therein against the fluid, and a shaft for operating said element, of a fluid passage connecting with said chamber, a control element operable to restrict said passage and having means associated therewith for varying the rate of flow of liquid through the passage and means on said shaft operable in one direction for actuating said control element, and operable in the opposite direction without influencing said control element.

4. The combination with a vehicle shock absorber having operating means for controlling the action of a spring caused by surface variations in a road including a cylinder, a piston movable therein against a fluid, and a shaft for operating said piston, of a fluid passage connecting with said cylinder, a plunger cylinder disposed transversely of said passage, a plunger reciprocable in the cylinder and having a tapered portion to vary the rate of flow of fluid through the passage, means for reciprocating the plunger, and means for retarding its operation in one direction.

5. The combination with a vehicle shock absorber having operating means for controlling the action of a spring caused by surface variations in a road, including a cylinder, a piston movable therein against the fluid, and a shaft for operating said piston, of a fluid reservoir, a fluid passage supplied by the reservoir and connecting with said cylinder, a choke for limiting the rate of flow of fluid between the passage and the reservoir, a plunger cylinder disposed transversely of said passage, a plunger reciprocable in the cylinder and having a tapered portion to vary the rate of flow of fluid through the passage, means for reciprocating the plunger, and means for retarding its operation in one direction.

6. The combination with a vehicle shock absorber having operating means for controlling the action of a spring caused by surface variations in a road including a cylinder, a piston movable therein against the fluid, and a shaft for operating said piston of a fluid reservoir, a fluid passage connecting with said cylinder, a plunger cylinder having a port leading to said reservoir, a plunger operable in the cylinder and having a tapered portion aligned with said passage, means for reciprocating the plunger to cause the tapered part thereof to control the rate of flow of the fluid through the passage, and means cooperating with said port to retard the flow of fluid from the reservoir into the plunger cylinder and the movement of the plunger in one direction.

7. The combination with a vehicle shock absorber having operating means for controlling the action of a spring caused by surface variations in a road, including a cylinder, a piston movable therein against the fluid, and a shaft for operating said piston, of a fluid reservoir, a fluid passage connecting with said cylinder, a plunger cylinder having a port leading to said reservoir, a plunger operable in the cylinder and having a tapered portion aligned with said passage, means including a projection on said piston operating shaft and a spring for reciprocating the plunger to cause the tapered part thereof to control the rate of flow of the fluid through the passage, and means cooperating with said port to retard the flow of fluid from the reservoir into the plunger cylinder and the movement of the plunger in one direction.

8. The combination with a vehicle shock absorber having operating means for controlling the action of a spring caused by surface variations in a road, including a cylinder, a piston movable therein against the fluid, and a shaft for operating said piston, of a fluid reservoir, a fluid passage connecting with said cylinder, a fluid cylinder having a port leading to said reservoir, a plunger operable in the cylinder and having a tapered portion aligned with said passage, means for reciprocating the plunger to cause the tapered part thereof to control the rate of flow of the fluid though the passage, and an adjustable choke cooperating with said port to retard the flow of fluid from the reservoir into the plunger cylinder and the movement of the plunger in one direction.

9. The combination with a vehicle shock absorber having operating means for controlling the action of a spring caused by surface variations in a road including a cylinder, a piston movable therein against the fluid and a shaft for operating said piston, of a fluid reservoir, a fluid passage connecting with said cylinder, a plunger cylinder having a port leading to said reservoir, a plunger operable in the cylinder and having a tapered portion aligned with said passage, means including a projection on said piston operating shaft and a spring for reciprocating the plunger to cause the tapered part thereof to control the rate of flow of fluid through the passage and an adjustable choke cooperating with said port to retard the flow of fluid from the reservoir into the plunger cylinder and the movement of the plunger in one direction.

10. The combination with a vehicle shock absorber having operating means for controlling the action of a vehicle spring caused by surface variations in a road, of means movable into position by movement of said vehicle spring in one direction to alter the action of said operating means, means for retarding the travel of said movable means and means for adjusting said retarding means.

11. In a vehicle shock absorber, means for automatically increasing the resistance of the absorber to vehicle spring action in accordance with the amplitude of said action and an expandible member for moving said resistance increasing means in one direction independently of the vehicle spring action, to decrease the resistance of said absorber.

12. In a vehicle shock absorber, means for automatically increasing the resistance of the absorber to spring action in accordance with the amplitude of said action, means for returning its resistance to normal, and means for delaying said return, independently of the spring action in one direction.

ALBERT E. FREEMAN. [L. S.]
WILLIAM T. LIVERMORE. [L. S.]